United States Patent [19]
Bennett et al.

[11] Patent Number: 4,665,579
[45] Date of Patent: May 19, 1987

[54] COUNTERBALANCING MECHANISM FOR AN EDGE-OF-DOCK DOCKBOARD

[75] Inventors: Mark A. Bennett, Milwaukee; Martin P. Hageman, Mequon; Joseph M. Delgado, Waukesha, all of Wis.

[73] Assignee: Kelley Company Inc., Milwaukee, Wis.

[21] Appl. No.: 791,986

[22] Filed: Oct. 28, 1985

[51] Int. Cl.⁴ .............................................. E01D 1/00
[52] U.S. Cl. ...................................... 14/71.1; 14/71.3
[58] Field of Search ...................... 14/69.5, 71.1, 71.3, 14/71.7; 414/584

[56] References Cited
U.S. PATENT DOCUMENTS

| | | | |
|---|---|---|---|
| 3,685,076 | 8/1972 | Loblick | 14/71.7 |
| 3,685,077 | 8/1972 | Wiener et al. | 14/71.3 |
| 3,806,976 | 4/1974 | Yoon | 14/69.5 X |
| 4,257,137 | 3/1981 | Hipp et al. | 14/71.3 |
| 4,398,315 | 8/1983 | Driear et al. | 14/71.3 |

Primary Examiner—James A. Leppink
Assistant Examiner—Matthew Smith
Attorney, Agent, or Firm—Andrus, Sceales, Starke & Sawall

[57] ABSTRACT

An improved counterbalancing mechanism for an edge-of-dock dockboard. The dockboard comprises a frame mounted on a loading dock and one end of a center plate is pivotally connected to the frame. A lip is hinged to the opposite end of the center plate and is movable between a downwardly hanging pendant position and an extended position where the lip forms an extension to the center plate. A counterbalancing mechanism includes a first link pivotally connected to the center plate, and a second link pivotally connected to the lip. The opposite ends of the links are connected together, and a counterbalancing mechanism, such as a spring, interconnects the first link and the frame of the dockboard. The linkage is constructed and arranged so that when the center plate is in a horizontal storage position and the lip is pendant, the force of the counterbalancing spring will urge the lip in toward the dock. When the lip is manually elevated, the counterbalancing spring will assist in pivoting the center plate from the horizontal to the vertical position and then assist in pivoting the lip to the vertical extended position. In the operational position of the dockboard, in which the extended lip rests on the bed of the truck, the force of the counterbalancing spring aids in maintaining the lip in the extended position.

12 Claims, 5 Drawing Figures

COUNTERBALANCING MECHANISM FOR AN EDGE-OF-DOCK DOCKBOARD

BACKGROUND OF THE INVENTION

Loading docks are frequently equipped with manual or hydraulically operated dockboards that act to bridge the gap and height difference between the dock and the bed of a truck to enable material handling equipment, such as a forklift truck, to move between the dock and the truck bed. One common form of dockboard is mounted in a pit or recess formed in the dock surface and includes a ramp or deckplate which is stored in a generally horizontal position flush with the upper surface of the dock and is movable to an upwardly inclined position. A lip is hinged to the forward edge of the ramp and can be pivoted between a downwardly hanging pendant position, an extended position where the lip forms an extension to the ramp.

Another less expensive type of dockboard is what is commonly referred to as an edge-of-dock type. With this type of dockboard, no pit or recess is required in the loading dock and the dockboard is mounted on the front vertical face of the dock.

A conventional edge-of-dock dockboard includes a center plate having its inner end hinged to the loading dock, and a lip is hinged to the outer end of the center plate. In the storage position, the center plate is positioned horizontally and extends outwardly from the dock, while the lip is in a downwardly hanging or pendant position and is located between the bumpers which are mounted on the front face of the dock.

In operation of a coventional edge-of-dock dockboard, a truck backs toward the dock into engagement with the bumpers, and an operator, standing on the dock and using a long, hook-like implement, engages the center plate and pivots it to the vertical position. The lip is then engaged by the hook and pivoted to the extended vertical position. The dockboard is then lowered to bring the extended lip into engagement with the truck bed.

Because of the weight of the center plate and the lip, it is very difficult to pivot the center plate and the lip upwardly to the vertical position.

Attempts have been made in the past to provide a counterbalancing mechanism for the edge-of-dock dockboard to reduce the amount of manual effort required to pivot the dockboard to its vertical position, but such counterbalancing mechanisms have not been entirely successful. If the counterbalance is applied only to the center plate, the entire weight of the lip must be lifted manually. On the other hand, if the counterbalance is applied to the lip, the lip may not properly extend and the lip may tend to bounce or jack-knife when in the extended position as a load travels across the dockboard. Because of this, there has been a need for a counterbalancing system that will partially counterbalance the weight of both the center plate and the lip and will also aid in maintaining the lip in an extended position.

SUMMARY OF THE INVENTION

The invention is directed to an improved counterbalancing mechanism for an edge-of-dock dockboard. In accordance with the invention, the counterbalancing mechanism includes a first link that is pivotally connected to the underside of the center plate of the dockboard, and a second link is pivotally connected to the underside of the lip. The opposite ends of the links are pivotally connected together, and a biasing means, such as a compression spring, interconnects the first link and the frame of the dockboard.

The linkage is constructed and arranged so that when the center plate is in a horizontal storage position and the lip is pendant, the force of the counterbalancing spring will urge the lip inwardly toward the dock. When the lip is manually elevated, the counterbalancing spring assists in pivoting the center plate upwardly from the horizontal to the vertical position and then assists in pivoting the lip to the vertical extended position.

In the operating position, where the extended lip rests on the bed of a truck, the counterbalancing force aids in maintaining the lip in the extended position to minimize jack-knifing of the lip and center plate.

The counterbalancing system of the invention acts to partially counterbalance the weight of both the center plate and the lip so that less manual effort is required to put the dockboard into its operating position.

The counterbalancing mechanism is also designed so that in the storage position, the counterbalancing force will draw the lip inwardly toward the dock, and in the operating position, the counterbalancing force acts to keep the lip extended to prevent knuckling or jack-knifing of the dockboard as a load traverses across the dockboard.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
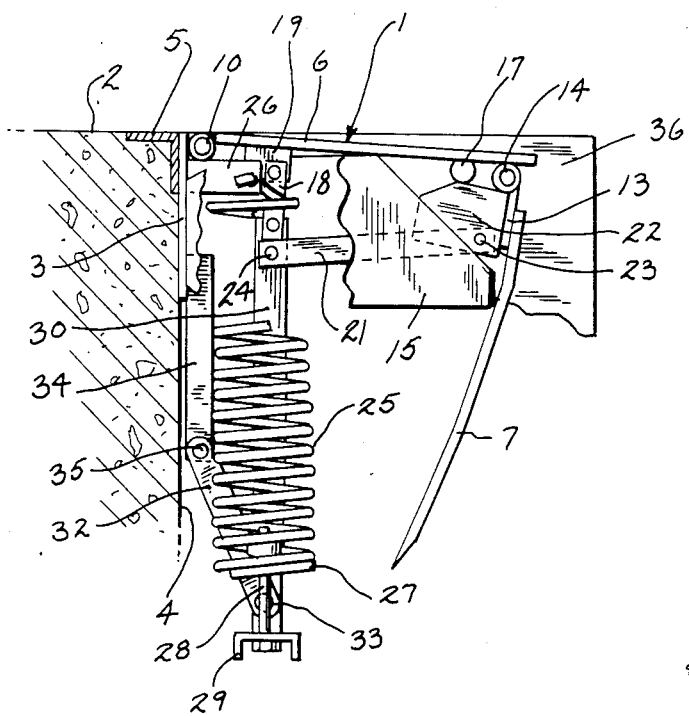
FIG. 1 is a side elevation of a dockboard of the invention with the dockboard shown in the storage position.

The drawings illustrate an edge of dock dockboard 1 mounted on a loading dock 2. Dockboard 1 includes a vertical mounting plate 3 that is secured to the front face 4 of dock 2 by conventional anchor bolts and to a corner angle 5 by welding.

Figure 3:
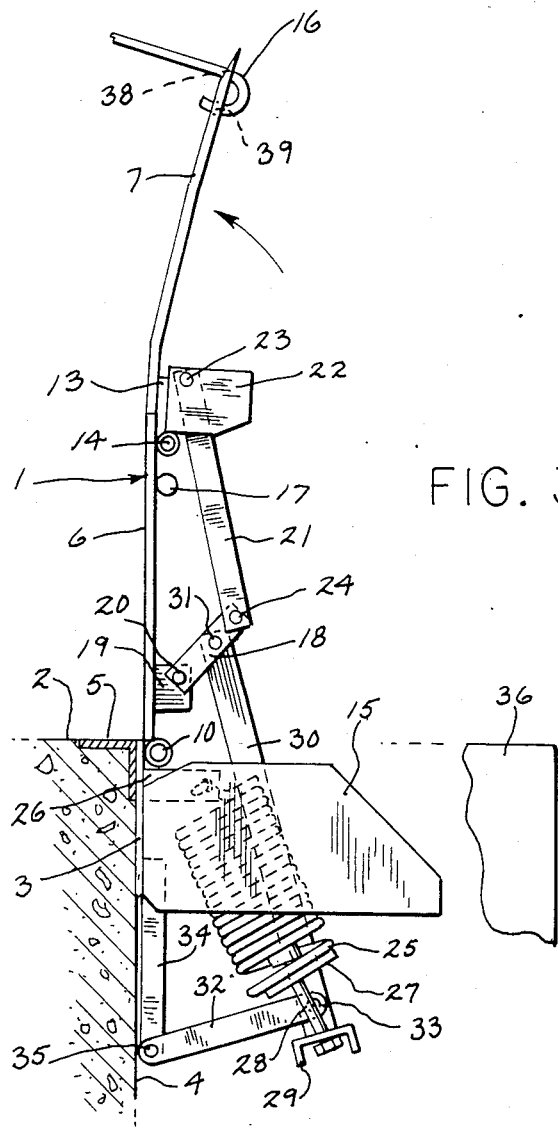
FIG. 3 is a view similar to FIG. 1 showing the dockboard in the vertical position.
Figure 4:
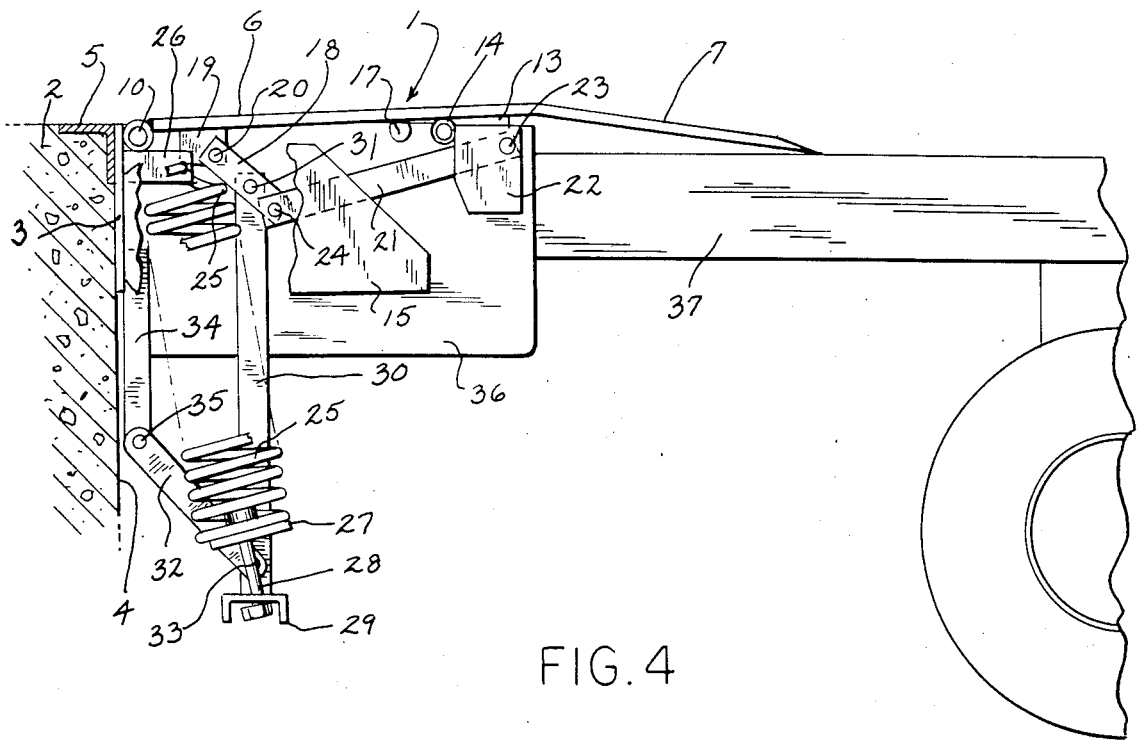
FIG. 4 is a view similar to FIG. 1 and showing the dockboard in the operating position with the lip resting on a truck bed.
Figure 5:
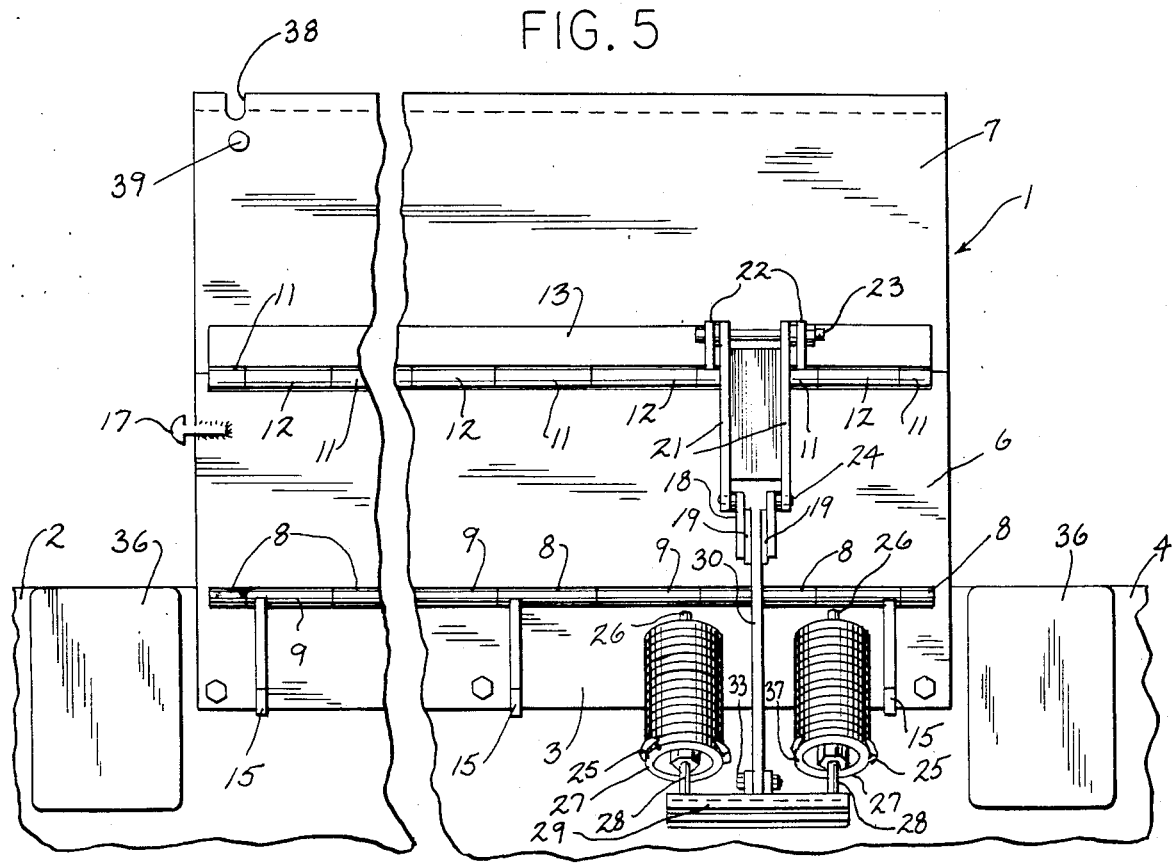
FIG. 5 is a front elevation of the dockboard shown in the position of FIG. 3.

Dockboard 1 includes a center plate 6 which is hinged to mounting plate 3 and is movable between a generally horizontal position, as shown in FIG. 1, and an upwardly extending generally vertical position, as shown in FIG. 3. A lip 7 is pivoted to the forward edge of center plate 6 and is movable between a downwardly hanging pendant position, as shown in FIG. 1, to an extended position, as shown in FIG. 4, where it forms an extension to center plate 6 and rests on a truck bed.

To provide the pivotal connection between center plate 6 and plate 3, a series of hinge tubes 8 are secured to the rear edge of center plate 6 and a second series of hinge tubes 9, aligned with tubes 8, are secured to plate 3. Hinge pin 10 extends through the aligned hinge tubes 8 and 9.

To provide the hinge connection between lip 7 and center plate 6, a series of hinge tubes 11 are secured to the under surface of plate 6 and are aligned with a group of hinge tubes 12 secured to the edge of strip 13 which is secured flatwise to the under surface of lip 7. A hinge pin 14 extends through the aligned hinge tubes 11 and 12. With this connection, the lip can be pivoted between the downwardly hanging pendant position and the extended position, as shown in FIG. 4, where the lip forms an extension to the ramp.

A series of support plates 15 extend outwardly from mounting plate 3 and serve to support the center plate in the horizontal position, as shown in FIG. 1.

Figure 2:
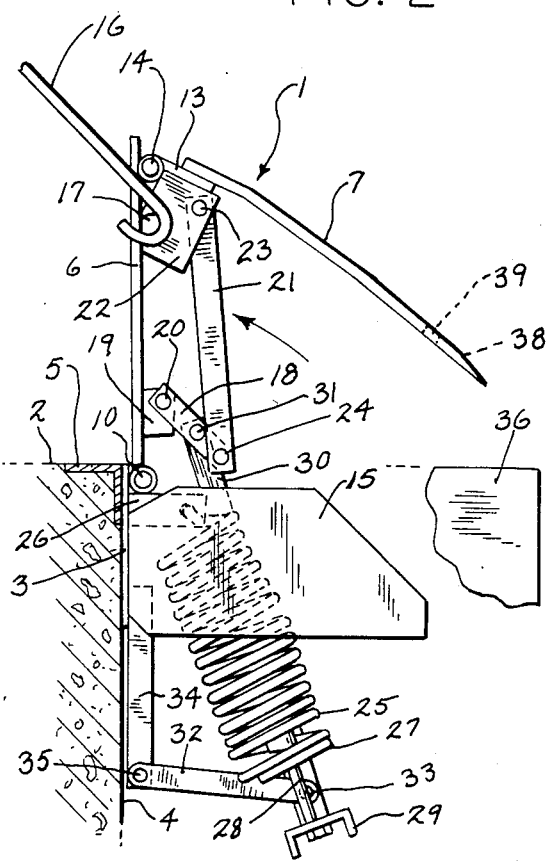
FIG. 2 is a view similar to FIG. 1 showing the dockboard being pivoted to the vertical position.

Center plate 6 is adapted to be pivoted upwardly through use of an elongated tool having a hook end 16. An operator standing on the loading dock will engage the hook 16 with a rivet or other projection 17 extending outwardly from the side edge of the center plate and by pulling upwardly, the center plate 6 will be pivoted to the vertical position, as shown in FIG. 2. The hook is then engaged with a slot 38 and hole 39 in lip 7 and further manual effort will then pivot the lip to the vertical extended position, as shown in FIG. 3.

In accordance with the invention, an improved counterbalancing mechanism is incorporated which assists in moving the center plate 6 and lip 7 to the vertical extended position, as illustrated in FIG. 3. The counterbalancing mechanism includes a pair of links 18 which are pivotally connected to lugs 19 on the under surface of center plate 6 at a pivot 20. A second pair of links 21 are pivotally connected to lugs 22 that are mounted edgewise to strip 13 at a pivot 23, while the opposite ends of links 18 and 21 are connected at a pivot 24.

A biasing mechanism is interconnected between the fixed frame of the dockboard and link 18. As illustrated, the biasing mechanism consists of a pair of compression springs 25 and the upper ends of springs 25 are connected to lugs 26 which extend outwardly from mounting plate 3, while the opposite ends of springs 25 are carried by spring seats 27 which are connected through bolts 28 to a channel-shaped bracket 29. The upper end of a link 30 is connected to link 18 at pivot 31, while the lower end of link 30 is secured to the channel 29. With this construction, the force of springs 25 will urge the link 30 upwardly.

A link 32 is connected to the lower end of link 30 at pivot 33, while the opposite end of link 32 is connected to the lower end of an arm 34 at pivot 35. Arm 34 is secured to mounting plate 3.

In the storage position, as shown in FIG. 1, center plate 6 will be in the horizontal position and lip 7 will hang downwardly. In this storage position, links 18 and 21 will be in an acute angle position with the counterbalancing force of springs 25 acting through link 30 to draw the lip inwardly against the lip support plate 15. In this storage position, lip 7 will be disposed inwardly of the resilient bumpers 36 which are mounted on the front face 4 of dock 2 and straddle the dockboard.

As a truck backs toward the loading dock, the truck bed 37 will engage bumpers 36. With the truck in a loading position, and operator standing on the loading dock will engage the elongated hook 16 with rivet 17 and pivot the center plate 6 upwardly, as shown in FIG. 2. Initial pivotal movement of the center plate will move the link 18 to an under center position so that the force of the springs 25 acting through link 30 will then aid in pivoting the center plate upwardly to the vertical position.

After the center plate has been moved to the vertical position as shown in FIG. 2, the hook 16 then is engaged with slot 38 and hole 39 in lip 7 and continual manual pull will pivot the lip 7 to the extended vertical position, as shown in FIG. 3. During this movement, the force of springs 25 will again assist in moving the lip to the extended position.

With the lip 7 extended, the operator then lowers the dockboard downwardly until the lip engages the truck bed 37, as illustrated in FIG. 4. In this operating condition, the counterbalancing force acting through the offset pivotal connection 23 will tend to urge the lip 7 to the extended condition to minimize the tendency for the lip to bounce or jack-knife as a load passes over the dockboard.

When the loading operation is completed, the truck pulls away from the dock 2 and the lip 7 will fall by gravity back to its pendant position, as shown in FIG. 1.

The counterbalancing mechanism of the invention provides a counterbalancing force to assist lifting of both the center plate and the lip, thereby requiring a lesser manual effort to put the dockboard into its operating position.

In the storage position, the counterbalancing force acts to draw the lip inwardly, while in the operating position, the counterbalancing force will act to maintain the lip in an extended position to prevent knuckling or jack-knifing of the dockboard as a load passes thereover.

Various modes of carrying out the invention are contemplated as being within the scope of the following claims particularly pointing out and distinctly claiming the subject matter which is regarded as the invention.

I claim:

1. In combination, a loading dock having a generally vertical front face, a manually operated edge-of-dock dockboard mounted on the loading dock and including a frame, a center plate having an inner end hinged to the frame and having an outer end and an under surface, said center plate being movable from a generally horizontal position wherein said center plate extends outwardly from said front face to a generally vertical position, a lip pivotally connected to the outer end of the center plate and movable between a downwardly hanging pendant position and an extended position where it forms an extension to said center plate, said lip having an under surface, a linkage comprising a first link having one end pivotally connected to the under surface of the center plate at a first pivot and a second link having one end pivotally connected to the under surface of the lip at a second pivot, the opposite ends of said first and second links being connected together at a third pivot, and biasing means interconnecting said frame and said linkage for partially counterbalancing the weight of said center plate and said lip to thereby aid in pivoting the center plate and the lip to the vertical position, said linkage and said biasing means being constructed and arranged so that when the center plate is in the horizontal storage position the force of said biasing means acts to urge the lip toward said pendant position and when the center plate is in the vertical position the force of said biasing means acts to urge the lip to said extended position.

2. The dockboard of claim 1, wherein said biasing means is connected to the first link at a fourth pivot located between said first and third pivots.

3. The dockboard of claim 2, wherein said links are constructed and arranged so that when the lip is in the pendant position and the center plate is in the horizontal position, said fourth pivot is a greater distance from said dock and said third pivot so that the force of said biasing means acts to draw the lip inwardly toward said dock.

4. The dockboard of claim 1, wherein said first and second links are disposed at an acute angle with respect to each other when the center plate is in the horizontal position and the lip is pendant.

5. The dockboard of claim 1, wherein said second pivot is offset a distance from the under surface of said lip whereby the force of said biasing means when the lip is extended will act to maintain the lip in the extended position.

6. In combination, a loading dock having a generally vertical front face, a manually operated edge-of-dock dockboard mounted on the loading dock and including a frame, a center plate having an inner end hinged to the frame and having an outer end and an under surface, said center plate being movable from a generally horizontal position wherein said center plate extends outwardly from said front face to a generally vertical position, a lip pivotally connected to the outer end of the center plate and movable between a downwardly hanging pendant position and an extended position where it forms an extension to said center plate, said lip having an under surface, a linkage comprising a first link having one end pivotally connected to the under surface of the center plate at a first pivot and a second link having one end pivotally connected to the under surface of the lip at a second pivot, the opposite ends of said first and second links being connected together at a third pivot, and biasing means interconnecting said frame and said linkage for partially counterbalancing the weight of said center plate and said lip to thereby aid in pivoting the center plate and the lip to the vertical position, said biasing means being connected to the first link at a fourth pivot located between said first and third pivots, the force of said biasing means acting along a line through said fourth pivot, said links and said biasing means being constructed and arranged so that when the center plate is in the storage position, the force of said biasing means acts to urge the lip toward said pendant position and when said center plate is in the vertical position the force of said biasing means acts to urge the lip to said extended position.

7. The dockboard of claim 6, wherein said third pivot is located inwardly toward said dock from said line when the center plate is horizontal and said lip is pendant, whereby the force of said biasing means acts to urge the lip to the pendant position.

8. The dockboard of claim 6, wherein said third pivot is located outwardly from said line when the center plate is in the vertical position.

9. The dockboard of claim 6, wherein said biasing means is connected to said frame at a level beneath said fourth pivot.

10. The dockboard of claim 9, wherein said biasing means comprises a spring.

11. The dockboard of claim 6, wherein said second pivot is offset a distance from the under surface of said lip whereby the force of said biasing means when the lip is extended will act to urge the lip in the extended position.

12. A manually operated edge-of-dock dockboard comprising, a frame to be mounted on a loading dock, a center plate having an inner end hinged to the frame and having an outer end and an under surface, said center plate being movable from a generally horizontal storage position to a generally vertical position, a lip pivotally connected to the outer end of the center plate and movable between a downwardly hanging pendant position and an extended position where it forms an extension to said center plate, said lip having an under surface, a first link having one end pivotally connected to the under surface of the center plate at a first pivot, a second link having one end pivotally connected to the under surface of the lip at a second pivot, the opposite ends of said first and second links being connected together at a third pivot, resilient biasing means interconnecting said frame to said first link at a fourth pivot located between said first pivot and said third pivot, the force of said biasing means acting along a line through said fourth pivot, and means for manually lifting said center plate from the horizontal position to the vertical position and for lifting the lip from the pendant position to the extended position, said links being constructed and arranged so that the force of said biasing means acts to partially counterbalance the weight of both the center plate and the lip as the center plate and lip are lifted.

* * * * *